United States Patent
Smith et al.

(10) Patent No.: US 11,983,373 B1
(45) Date of Patent: May 14, 2024

(54) FILTER IN A CAPACITANCE MEASURING CIRCUIT

(71) Applicant: Cirque Corporation, Sandy, UT (US)

(72) Inventors: Tyler Smith, American Fork, UT (US); David Taylor, West Jordan, UT (US); Michael Litster, Kaysville, UT (US)

(73) Assignee: Cirque Corporation

( * ) Notice: Subject to any disclaimer, the term of this patent is extended or adjusted under 35 U.S.C. 154(b) by 0 days.

(21) Appl. No.: 18/105,971

(22) Filed: Feb. 6, 2023

(51) Int. Cl.
*G06F 3/044* (2006.01)
*H01Q 1/22* (2006.01)
*G06F 3/041* (2006.01)

(52) U.S. Cl.
CPC .......... *G06F 3/0446* (2019.05); *G06F 3/0443* (2019.05); *H01Q 1/2266* (2013.01); *G06F 3/04166* (2019.05)

(58) Field of Classification Search
CPC .. G06F 3/0446; G06F 3/0443; G06F 3/04166; H01Q 1/2266
See application file for complete search history.

(56) References Cited

U.S. PATENT DOCUMENTS

| | | | |
|---|---|---|---|
| 7,148,851 B2 | 12/2006 | Takaki | |
| 8,279,121 B2 | 10/2012 | Ishizuka et al. | |
| 9,178,572 B1* | 11/2015 | Zhang | H04B 5/77 |
| 9,740,342 B2 | 8/2017 | Paulsen | |
| 9,899,732 B2 | 2/2018 | Urica | |
| 10,732,764 B1* | 8/2020 | Shanmugam | H01Q 1/44 |
| 2008/0191797 A1* | 8/2008 | Chiu | H03H 11/04 |
| | | | 327/559 |
| 2018/0188838 A1* | 7/2018 | An | H04B 5/72 |
| 2022/0365649 A1* | 11/2022 | Nomura | G06F 3/04166 |

FOREIGN PATENT DOCUMENTS

JP    2011002948 A    1/2011

* cited by examiner

*Primary Examiner* — Md Saiful A Siddiqui

(57) ABSTRACT

A device may include a first set of electrodes, a second set of electrodes that is transverse the first set, and at least one connection between an electrode in the first set to an electrode in the second set by a high pass filter. The connected electrode(s) in the first set and the connected electrode(s) in the second set may form an antenna. The device may include a processor and memory. The memory may store programmed instructions which cause the processor, when executed, to transmit a wireless signal using the connected electrodes during a first time, and measure a capacitance signal using electrodes in the first set and electrodes in the second set during a second time.

16 Claims, 9 Drawing Sheets

FILTER IN A CAPACITANCE MEASURING CIRCUIT

FIELD OF THE DISCLOSURE

This disclosure relates generally to systems and methods for capacitance modules. In particular, this disclosure relates to systems and methods for transmitting wireless signals and sensing capacitance using electrodes in a capacitance module.

BACKGROUND

A capacitance touch pad is often incorporated into personal computers and other devices to provide a mechanism for giving inputs to the device. Because electrical signals from an antenna may interfere with electrical signals from a touch pad, antennas and touchpads are typically shielded from each other using shielding material or are otherwise located in different locations of a device to minimize interference. In some devices, an antenna may be located beneath a touch pad. In such devices, special structures are located between the antenna and touch pad to allow each to operate with limited interference with one another.

An example of an antenna device is disclosed in U.S. Pat. No. 8,279,121, issued to Kenichi Ishizuka, et al. This reference describes that a compact antenna device is disclosed in which no interference occurs, even when many antenna units corresponding to various systems are mounted close together in a small area. An antenna device includes plural antenna units mounted on a single dielectric base. A first antenna unit having a lowest fundamental frequency is disposed at a left end of a non-ground region, a second antenna unit having a highest fundamental frequency of the plurality of the antenna units is disposed at a right end of the non-ground region, and a third antenna unit having a fundamental frequency between those of the first antenna unit and the second antenna unit is disposed between the first and second antenna units. A current-density control coil is connected between a first radiation electrode and a power feeder of the first antenna unit, while a reactance circuit is disposed in the middle of the first radiation electrode. Notches may be disposed between the first radiation electrode and a second radiation electrode and between the first radiation electrode and a third radiation electrode.

Another example of an antenna is disclosed in U.S. Pat. No. 9,899,732, issued to Manny S. Urcia, et al. This reference describes that a reconfigurable antenna is provided having a liquid metal in contact with an electrolyte with the liquid metal being in a first configuration. A plurality of electrodes includes a first electrode in contact with the liquid metal and a second electrode in contact with the electrolyte. A voltage source connected across the first and second electrodes applies a voltage of a predetermined magnitude and a predetermined polarity in order to move the liquid metal from the first configuration to a second configuration and to measure resultant current flow and modify the applied voltage based on the resultant current flow. Cessation of the applied voltage locks the liquid metal in this second configuration.

An example of an antenna located beneath a touchpad is disclosed in Japan Patent 2011/002948A. The touch pad input device with an antenna is provided with a sensing face exposed at an opening set at a shield member for shielding a radiation noise in electronic equipment. Then, the touch pad input device with an antenna is provided with an electrode group which is provided along the sensing face and detects the position of an object coming in contact with the sensing face, based on the change of a capacitance, and an antenna arranged between the electrode group and the sensing face and for communicating with external equipment. The antenna is arranged apart from the external edge of the sensing face by 5 mm or more when it is viewed from the in-face direction of the sensing face.

Each of these references are herein incorporated by reference for all that they disclose.

SUMMARY

In one embodiment, a device may include a set of electrodes incorporated into a capacitance measuring circuit and a high pass filter with a cutoff frequency incorporated into the capacitance measuring circuit. The capacitance measuring circuit may be configured to transmit a wireless signal when the capacitance measuring circuit receives a voltage signal with a frequency greater than the cutoff frequency of the high pass filter.

The device may include a comparator circuit incorporated into the capacitance measuring circuit.

The comparator circuit may distinguish between a capacitance measurement signal and a wireless transmission signal from the capacitance measuring circuit.

The signals generated by the capacitance measuring circuit may have a frequency lower than the cutoff frequency of the high pass filter.

The high pass filter may incorporate at least one transistor.

The capacitance measuring circuit may be a mutual capacitance sensor.

The wireless signal may be transmitted according to a Wi-Fi protocol.

The wireless signal may be transmitted according to a short-range wireless protocol.

The wireless signal may be transmitted according to a Near Field Communication (NFC) protocol.

In another embodiment, a device may include a first set of electrodes, a second set of electrodes that is transverse the first set, and at least one connection between a first electrode in the first set to a second electrode in the second set with a high pass filter. The first electrode in the first set and the second electrode in the second set may form an antenna.

The device may also include a processor and memory. The memory may store programmed instructions which cause the processor, when activated, to transmit a wireless signal using the first electrode and the second electrode during a first time and measure a capacitance signal using the first electrode in the first set and the second electrode in the second set during a second time.

The duration of the second time may be seven milliseconds or less.

The duration of the first time and the duration of the second time may change in response to programmed instructions executable by the processor.

Changing the duration of the first time may be based, at least in part, on the capacitance signal measured with the first electrode and the second electrode.

Changing the duration of the second time may be based, at least in part, on the wireless signal transmitted with the first electrode and the second electrode.

The cutoff frequency of at least one high pass filter may be less than the frequency of the transmitted wireless signal.

In another embodiment, a method may include transmitting a wireless signal using an electrode in a capacitance module during a first time period, and measuring a capacitance using the electrode in the capacitance module during a second time period.

The duration of the first time period may overlap with the duration of the second time period.

The durations of the first time period and second time period may be mutually exclusive.

The durations of the first time period and the second time period may change in response to instructions executable by a processor in electrical communication with the capacitance module.

Figure 1:
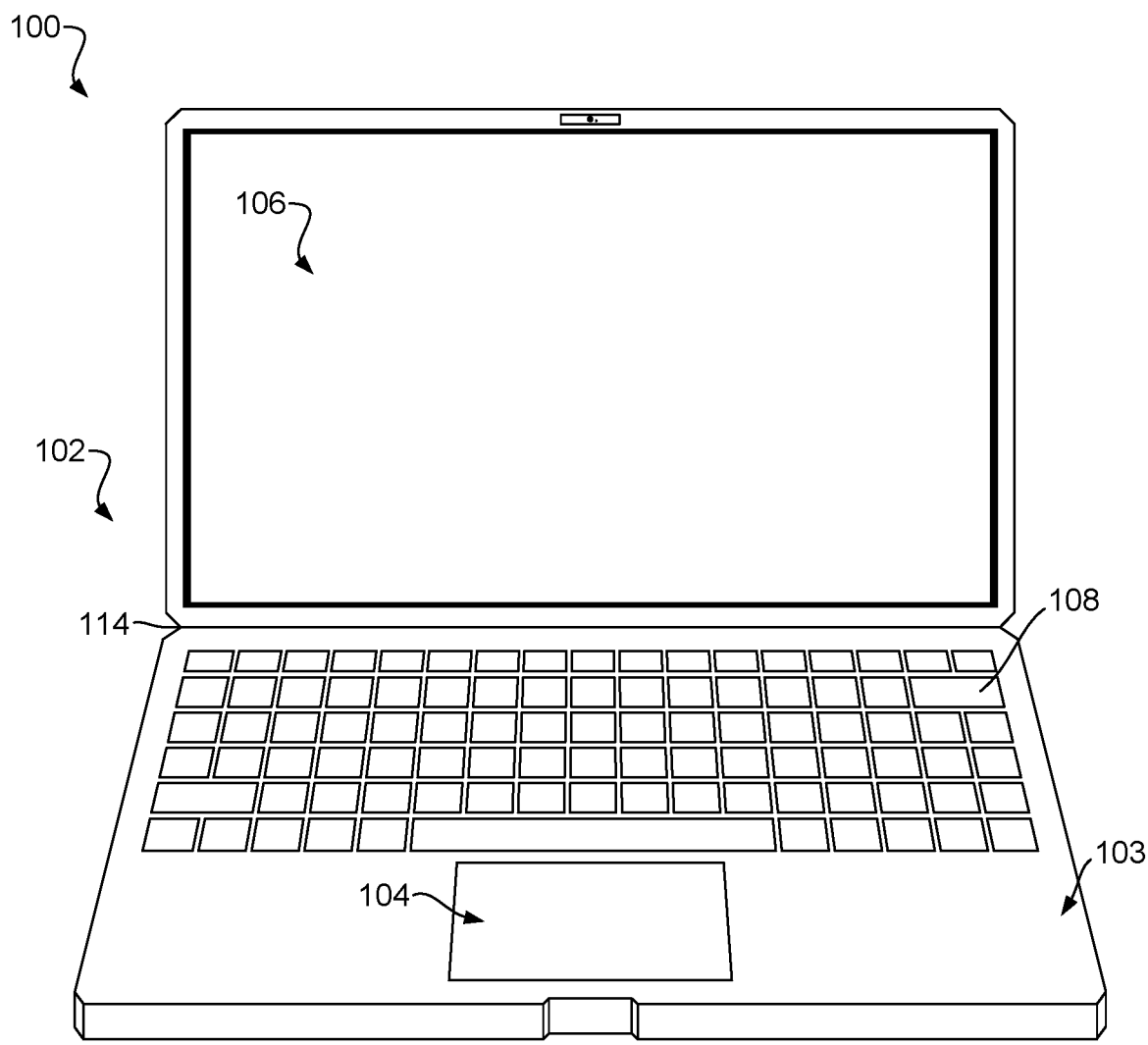
FIG. 1 depicts an example of an electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability, or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "electronic device" may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, an automation device, a security device, a display, a vehicle, an infotainment system, an audio system, a control panel, another type of device, an athletic tracking device, a tracking device, a card reader, a purchasing station, a kiosk, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen."

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

For the purposes of this disclosure, the term "peak-to-peak voltage" may generally refer to the voltage measured from a relative maximum to a relative minimum in a time varying voltage signal. The peak-to-peak voltage may be measured by processing resources. In some examples where a time varying voltage signal varies according to more than one frequency, a signal may have a peak-to-peak voltage that corresponds to each frequency of the signal. For example, for a voltage signal containing frequency components of 1 kHz and 5 kHz, the peak-to-peak voltage of the 1 kHz component may be 10 mV, whereas the peak-to-peak voltage of the 5 kHz component may be 20 mV.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by deposited at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approach the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
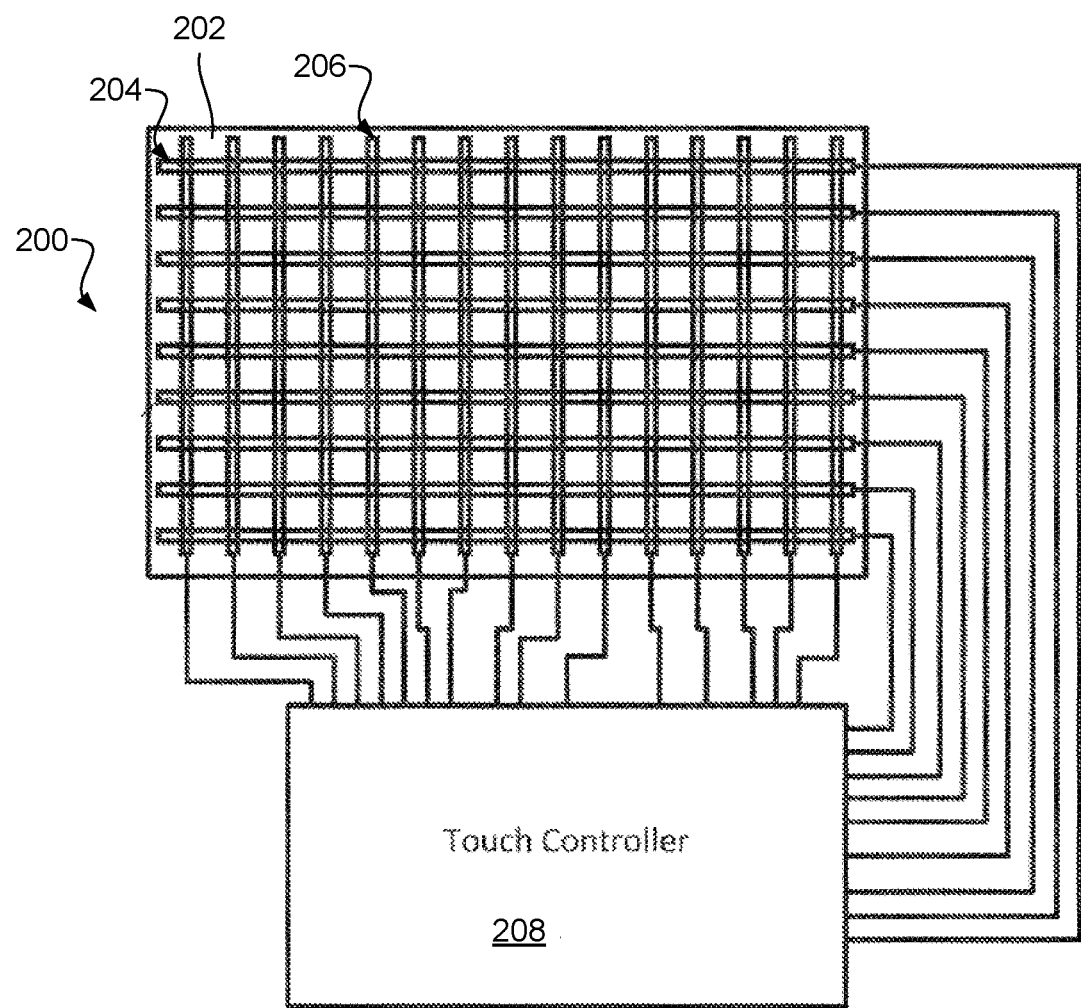
FIG. 2 depicts an example of a substrate with a first set of electrodes and a second set of electrodes in accordance with the disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
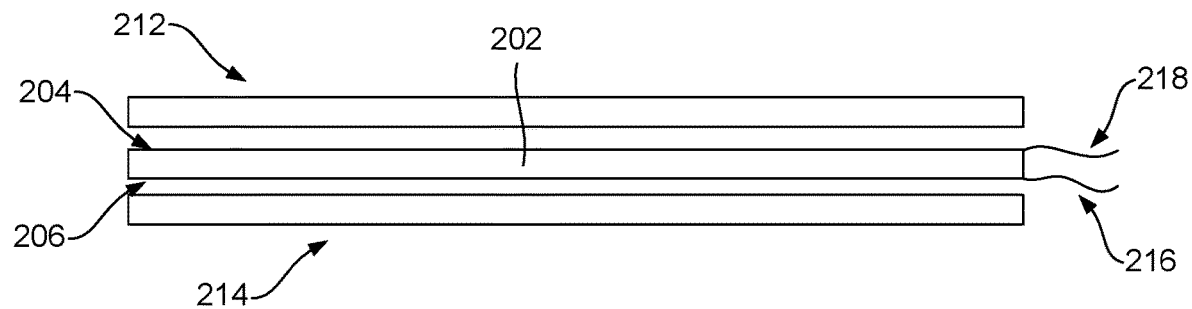
FIG. 3 depicts an example of a touch pad in accordance with the disclosure.

FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approach the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
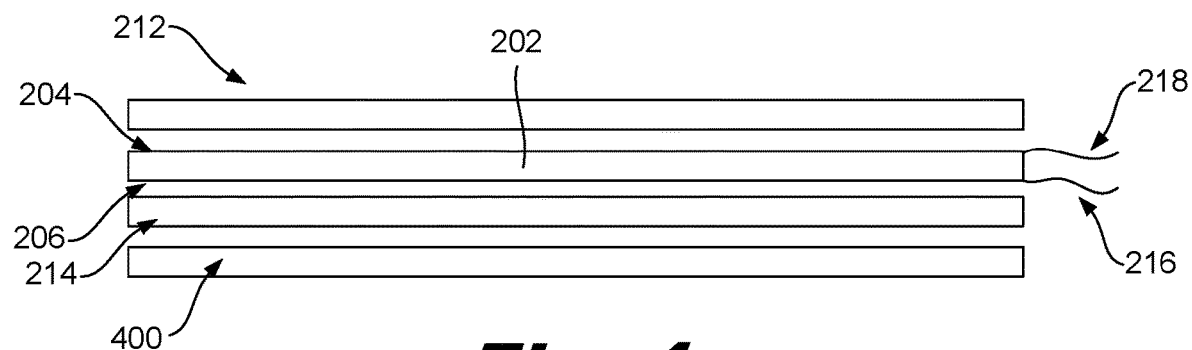
FIG. 4 depicts an example of a touch screen in accordance with the disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

Figure 5A:
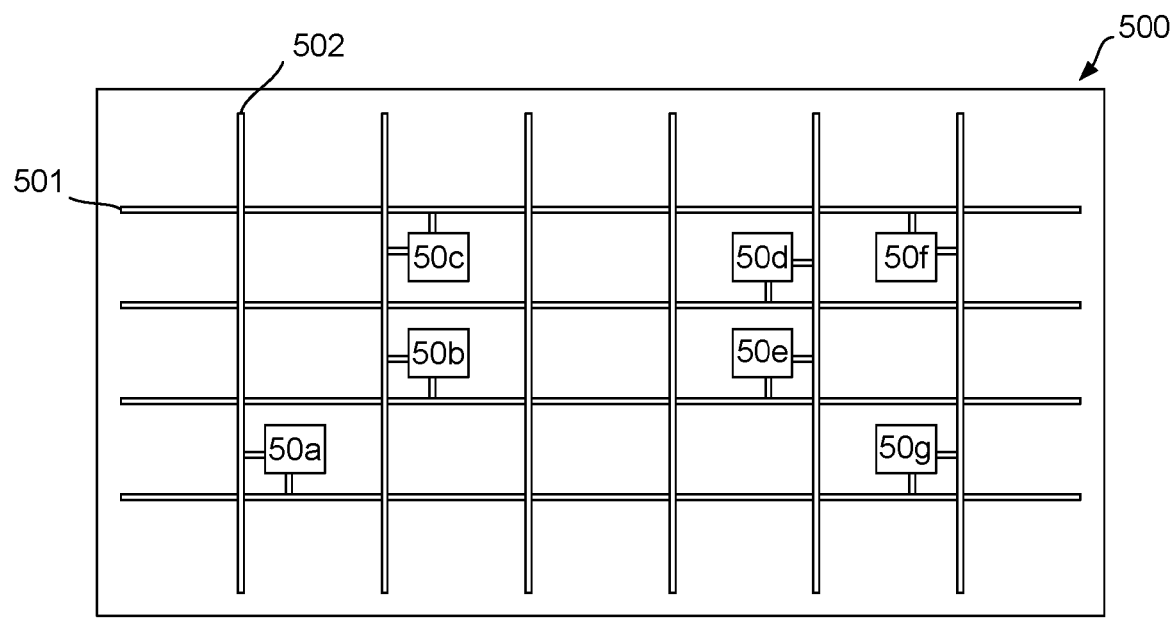
FIG. 5a depicts an example of a capacitance module in accordance with the disclosure.

FIG. 5a depicts an example of a capacitance module 500 in accordance with the disclosure. In this example, the capacitance module 500 includes a first set 501 of electrodes and a second set 502 of electrodes. The electrodes in the first set 501 may be arranged along the length of the capacitance module 500. The electrodes in the second set 502 may be arranged along the width of the capacitance module 500. The electrodes in the first set 501 and second set 502 may cross each other. The first set 501 and second set 502 of electrodes may form a mutual capacitance sensor.

While this example depicts a capacitance module 500 with two sets 501, 502 of electrodes, in other examples, a capacitance module may have a different number of sets of electrodes. For example, in instances where a capacitance module incorporates a self-capacitance sensor, the capacitance module may include just one set of electrodes or multiple sets of electrodes. In other examples, a capacitance module may include three sets of electrodes, four sets of electrodes, another number of sets of electrodes, or combinations thereof.

The electrodes in the first set 501 and second set 502 may be made of copper, gold, another conductive material, or combinations thereof. The electrodes in the first set 501 and second set 502 may sense electrodes, transmit electrodes, another type of electrode, or combinations thereof. In some examples the electrodes in the first set 501 may act as transmit electrodes while the electrodes in the second set 502 act as sense electrodes. In other examples, the electrodes in the first set 501 may act as sense electrodes while the electrodes in the second set 502 act as transmit electrodes. In yet other examples, electrodes in either the first set 501 or the second set 502 may act as sense electrodes at one time and transmit electrodes at another time.

During the operation of the capacitance module 500, a time varying electrical voltage may be applied to the transmit electrodes, which in some embodiments is the first set 501 and in other embodiments is the second set 502. When a time varying voltage is applied to the transmit electrodes in the capacitance module 500, a time varying voltage signal may be generated on the sense electrodes of the capacitance module. The voltage of the sense electrodes may be measured with processing resources and interpreted as input detected with the capacitance module 500.

The time varying voltage applied to the transmit electrodes and the time varying voltage signals generated in the sense electrodes may have frequencies between 1 kHz and 800 kHz. The frequency of the signal generated in the sense electrodes may be determined, at least in part, by the frequency of the signal applied to the transmit electrodes and the capacitance between the transmit electrodes and the sense electrodes in the capacitance module 500.

A user may interact with the capacitance module 500 by bringing a finger, stylus, or other object near the sensor with the first and second sets 501, 502 of electrodes. When the object is brought near the sensor, the capacitance between the transmit electrodes and the sense electrodes may change, which may change the frequency of the signal generated in the sense electrodes. Processing resources electrically connected to the capacitance module may determine the location of user input based on the frequency of the voltage signals generated in the sense electrodes.

The electrodes of the first set 501 may be connected to the electrodes of the second set 502 by multiple high pass filters. In the depicted example, a first high pass filter 50*a*, a second high pass filter 50*b*, a third high pass filter 50*c*, a fourth high pass filter 50*d*, a fifth high pass filter 50*e*, a sixth high pass filter 50*f*, and a seventh high pass filter 50*g* connect portions of the electrodes in the first set 501 to portions of the electrodes in the second set 502. The high pass filters 50*a*-50*g* may be located on the capacitance module 500 such that the connected portions of electrodes in the first set 501 and second set 502 form an antenna.

While the example in FIG. 5*a* depicts the capacitance module 500 having seven high pass filters 50*a*-50*g* which connect portions of the electrodes in the first set 501 to portions of the electrodes in the second set 52, in other examples, a different number of high pass filters may connect a different number of electrode portions. The number of high pass filters used to connect electrode portions may correspond to the antenna type. In some examples, a capacitance module may include one high pass filter, three high pass filters, six high pass filters, a different number of high pass filters, or combinations thereof. Other factors may also contribute to the number of high pass filters used to connect portions of electrodes in a capacitance module, such as the antenna size, antenna function, antenna range, antenna strength, other characteristics of the antenna, or combinations thereof.

The high pass filters 50*a*-50*g* may have cutoff frequencies between 1 MHz and 5 GHz. In some examples, the cutoff frequency of each high pass filter may be different. For example, the cutoff frequency of the first high pass filter 50*a* may be 200 MHz, the cutoff frequency of the second high pass filter 50*b* may be 300 MHz, the cutoff frequency of the third high pass filter 50*c* may be 400 MHz, and so on. In other examples, two or more high pass filters may have identical cutoff frequencies. For example, the first high pass filter 50*a* and the fifth high pass filter 50*e* may each have a cutoff frequency of 1 GHz.

The cutoff frequencies of the high pass filters 50*a*-50*g* in the capacitance module 500 may allow certain voltage signals with frequencies greater than the cutoff frequency to pass between transmit electrodes and sense electrodes in the capacitance module and block voltage signals with frequencies less than the cutoff frequency from passing between transmit electrodes and sense electrodes in the capacitance module. The high pass filters may enable high frequency signals and low frequency signals to be conducted through the electrodes of the first set 501 and second set 502 simultaneously. For example, a voltage signal with a frequency of 200 kHz and a voltage signal with a frequency of 2 GHz may be applied to transmit electrodes in the capacitance module 500 at the same time. The voltage signal with a frequency of 2 GHz may pass through the high pass filters connecting the transmit electrodes to the sense electrodes, while the voltage signal with a frequency of 200 kHz may be conducted on the transmit electrodes.

High frequency voltage signals that pass through the high pass filters 50*a*-50*g* may be conducted through portions of the electrodes of the first set 501 and electrodes of the second set 502 that form the antenna. When high frequency voltage signals are conducted through the portions of electrodes that form the antenna, a wireless signal may be generated from the antenna. The wireless radio signal may correspond to a Wi-Fi protocol, short-range wireless protocol, Near Field Communication (NFC) protocol, another wireless signal protocol, or combinations thereof.

Figure 5B:
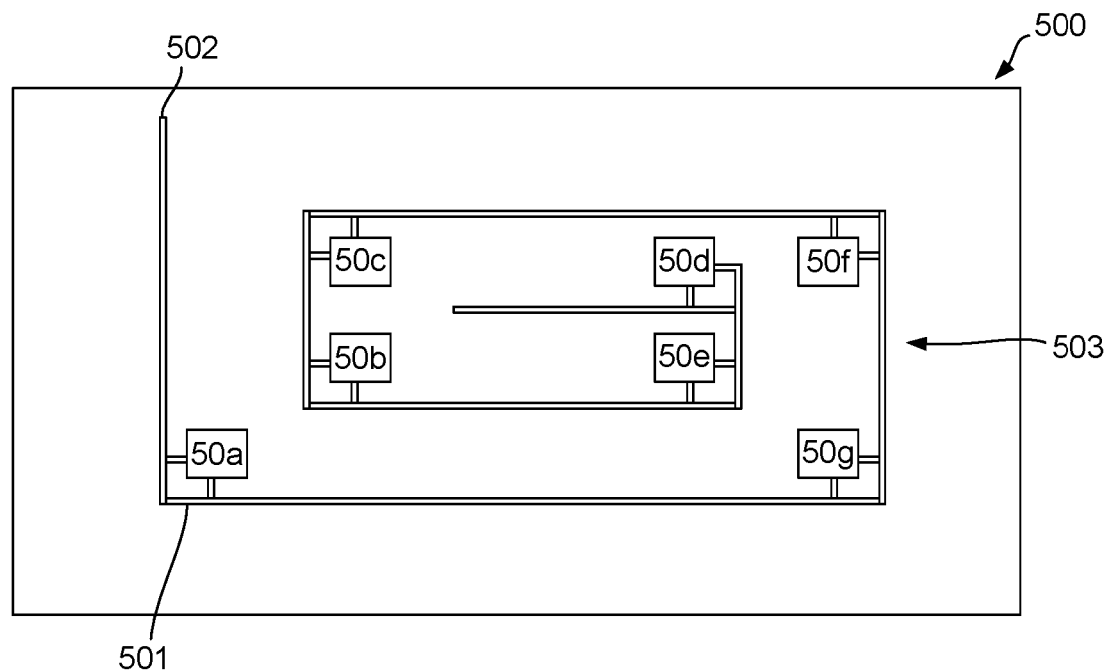
FIG. 5b depicts an example of a capacitance module in accordance with the disclosure.

FIG. 5*b* depicts the capacitance module 500 in accordance with the disclosure. For illustrative purposes, only portions of the electrodes in the first set 501 and second set 502 that form the antenna are depicted in this example. These portions of electrodes in the first set 501 and second set 502 form the antenna 503. These portions of electrodes in the first set 501 and second set 502 are connected by the high pass filters 50*a*-50*g*.

The antenna 503 depicted in this example has a spiral shape. The shape of antenna may be useful in transmitting wireless signal according to the desired protocol, such as a NFC protocol. In other examples, an antenna 503 may have a different shape. The shape of an antenna may correspond to the wireless signal generated by the antenna. In other examples, an antenna may have a spiral shape, a square wave shape, another type of shape, or combinations thereof.

Thus, when it is desirable to transmit a wireless signal through the antenna, the transmit electrodes may apply a voltage signal with a frequency in the appropriate range. Such a signal may cause the high pass filters to direct the signal through the antenna rather than through other portions of the capacitance sensing circuit. As a result, the sensor may transmit a wireless signal rather than sense capacitance. On the other hand, with the transmit signal is below the high pass filer's cutoff frequency, the signals may result in the sensor measuring capacitance.

Further, when a wireless signal in the appropriate signal range is received at the sensor, the high pass filters direct the signal through the antenna rather than through the other portions of the capacitance sensor. In this example, a high pass filter may direct the received antenna signal to processing resources that are configured to process antenna signals.

Figure 6:
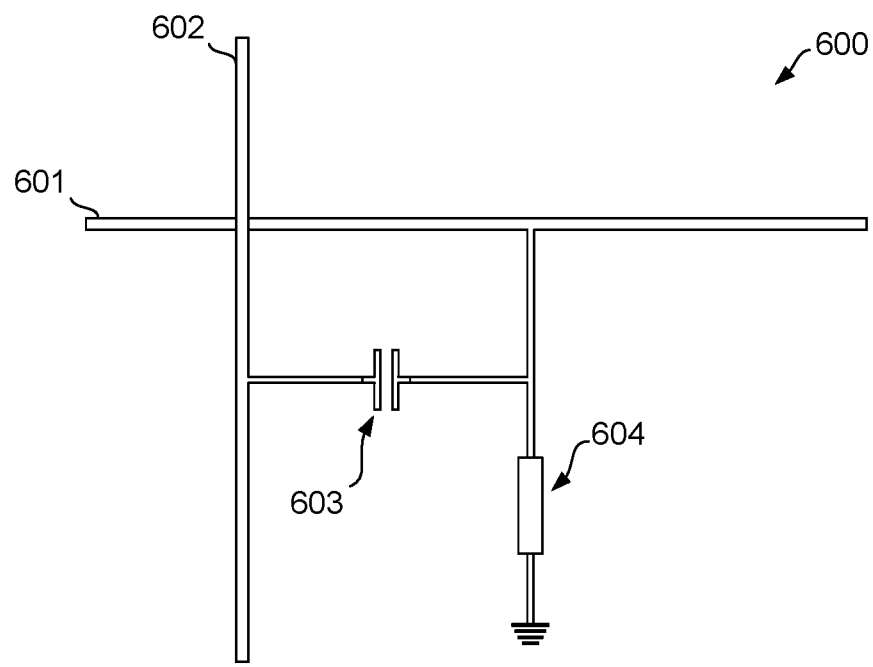
FIG. 6 depicts an example of a high pass filter in accordance with the disclosure.

FIG. 6 depicts an example of a first order high pass filter 600 in accordance with the disclosure. In this example, the filter 600 includes a capacitor electrically connected to a resistor 604. A first end of the capacitor 603 is connected to a first electrode 601 and a first end of the resistor 604. A second end of the capacitor 603 is connected to a second electrode 602. A second end of the resistor 604 is connected to ground. The cutoff frequency of the filter 600 may correspond to the capacitance values of the capacitor 603 and the resistance values of the resistor 604. The capacitance value of the capacitor 603 and the resistance value of the resistor 604 may be determined to achieve a particular cutoff frequency. The high pass filters 50*a*-50*g* depicted in FIG. 5*a* may be the type of high pass filter described in this example.

Figure 7:
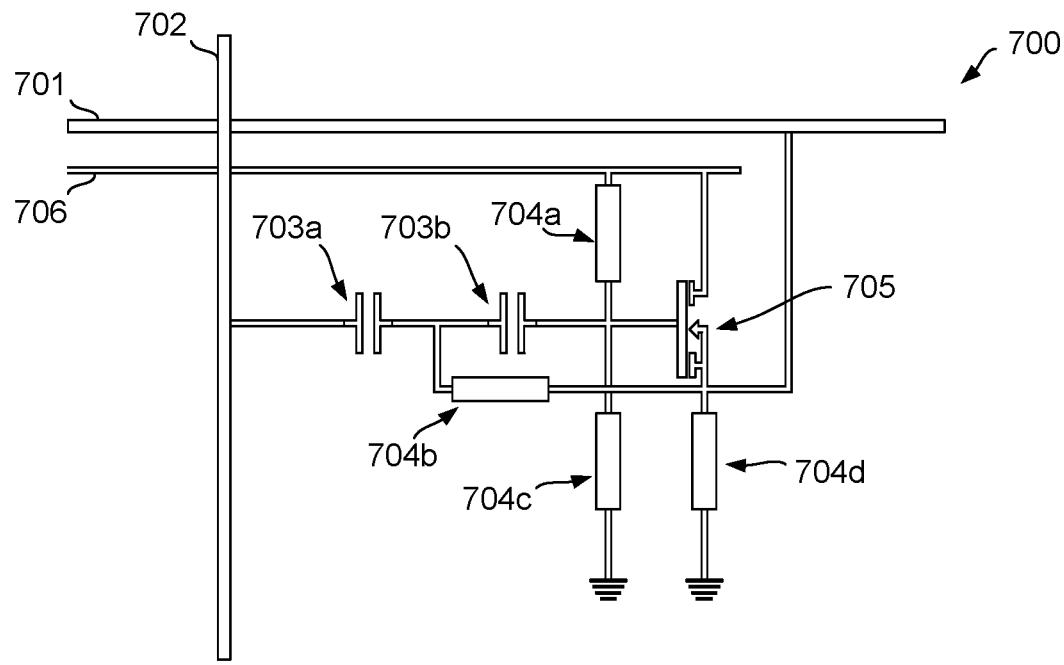
FIG. 7 depicts an example of a high pass filter in accordance with the disclosure.

FIG. 7 depicts an example of a higher order high pass filter 700 in accordance with the disclosure. In this example, the filter 700 includes a first capacitor 703*a*, a second capacitor 703*b*, a first resistor 704*a*, a second resistor 704*b*, a third resistor 704c, a fourth resistor 704d, and a transistor 705. The filter 700 is electrically connected to a first electrode 701 and a second electrode 702, along with a trace 706 electrically that is configured to provide power to the filter. In this example, the first capacitor 703a is connected in series with the second capacitor 703b to the gate terminal of the transistor 705. The first resistor 704a is connected in series with the third resistor 704c to ground and connects the trace 706 to the gate of the transistor. The second resistor 704 is connected to the source of the transistor 705, the fourth resistor 704d, and the first electrode 701. The cutoff frequency of the filter 700 may correspond to the capacitance values of the first capacitor 703 and second capacitor 703b, the first resistor 704a, second resistor 704b, third resistor 704c, and fourth resistor 704d, and the threshold voltage of the transistor 705. The transistor 705 may be a negative metal-oxide semiconductor (NMOS) transistor. The high pass filters 50a-50g depicted in FIG. 5a may be the type of higher order high pass filter depicted in this example.

The higher order high pass filter 700 depicted in this example may differ from the construction of higher order high pass filters in other examples. In other examples, a higher order high pass filter may feature a different number of capacitors, a different number of resistors, a different number of transistors, or combinations thereof. In other examples, a higher order high pass filter may feature capacitors with different capacitance values, resistors with different resistance values, transistors with different parameters, or combinations thereof.

The high pass filter 600 and higher order high pass filter 700 may present different advantages and drawbacks. The type of filter used in a capacitance module may differ based on the specifications of the capacitance module. In some examples, a capacitance module may include some high pass filters of the same type as filter 600 and some higher order high pass filters of the same type as filter 700. In other examples, a capacitance module may include only high pass filters of the same type as filter 600, and vice versa.

One advantage of the high pass filter 600 may be its relatively small footprint and cost. In cases where the high pass filter 600 includes only two components, a capacitor and a resistor, this type of filter may be used when a capacitance module is constrained by size. The first order high pass filter 600 may have a gradual voltage attenuation for voltage signals with frequencies near the cutoff frequency of the filter. While the gradual voltage attenuation may be sufficient for applications in which there is a significant difference between the frequencies of voltage signals generated for capacitance measurements and voltage signals generated for wireless transmissions, in applications where the frequencies of these voltage signals are close to each other, a different type of filter may be used.

One advantage of the higher order high pass filter 700 may be its steep rate of voltage attenuation within the transition band of the filter. The higher order high pass filter 700 may have a steep voltage attenuation for voltage signals with frequencies near the cutoff frequency of the filter. The steeper voltage attenuation of the filter 700 may be caused by the transistor 705 in the filter. In applications where the frequencies of voltage signals generated for wireless transmissions and the frequencies of voltage signals generated for capacitance measurements are close, this type of filter may be used. The filter 700 may also feature greater bandwidth than the filter 600, which may be desirable in some applications. The filter 700 includes many more parts than the filter 600, which may increase the filters cost and size footprint. In applications where the size or cost of a capacitance module is a restraint, a different type of filter may be used.

Figure 8:
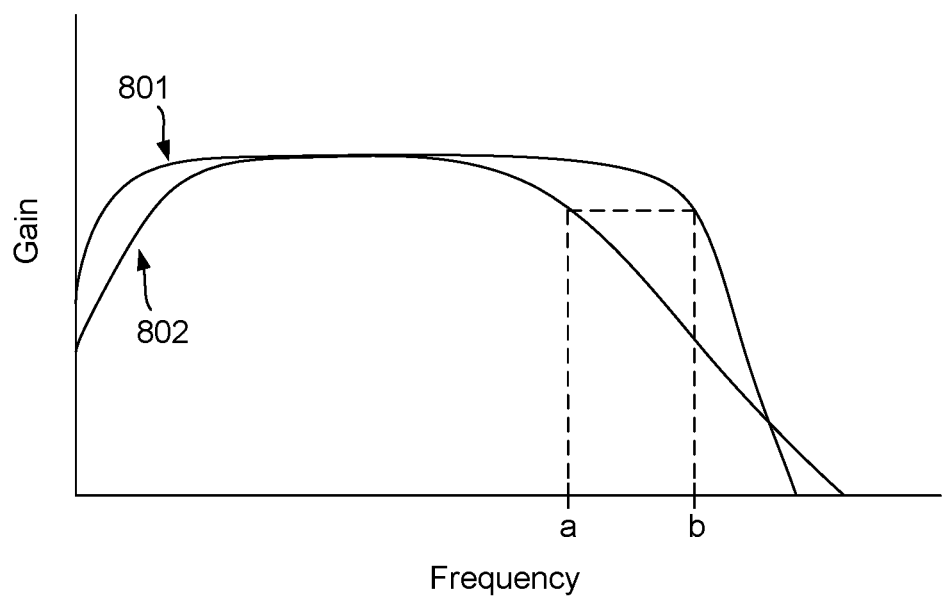
FIG. 8 depicts an example of a bode plot in accordance with the disclosure.

FIG. 8 depicts an example of a bode plot in accordance with the disclosure. For illustrative purposes, the frequency response 802 of the high pass filter 600 is plotted along with the frequency response 801 of the higher order high pass filter 700. The cutoff frequency of the high pass filter 600 is shown at point a, and the cutoff frequency of the higher order high pass filter 700 is shown at point b.

The frequency response 802 may have a more gradual attenuation within its transition band compared to the steeper attenuation within the transition band of the frequency response 801. Additionally, the cutoff frequency or bandwidth of the frequency response 802 may be lower than the cutoff frequency or bandwidth of the frequency response 801.

Figure 9A:
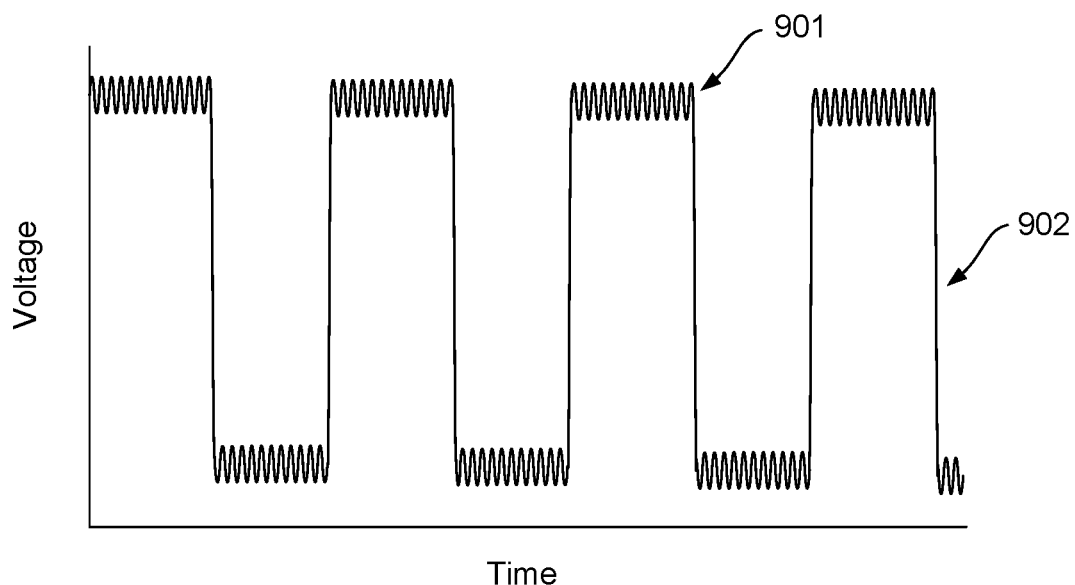
FIG. 9a depicts an example of a signal graph in accordance with the disclosure.

FIG. 9a depicts an example of a signal chart in accordance with the disclosure. In this example, a voltage signal on an electrode may include a high frequency component 901 and a low frequency component 902. The high frequency component 901 may correspond to a voltage for transmitting a wireless signal. The low frequency component 902 may correspond to a voltage for measuring a capacitance.

Figure 9B:
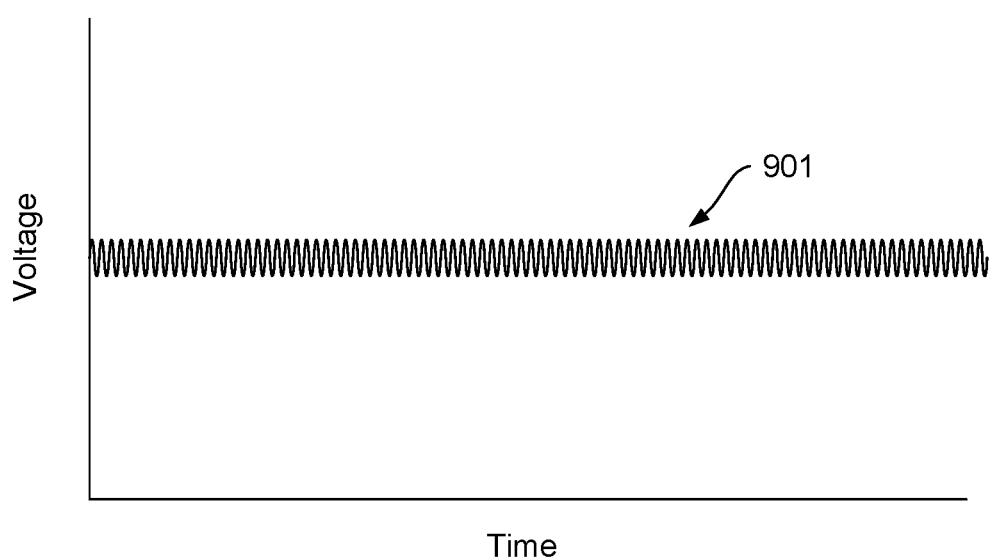
FIG. 9b depicts an example of a signal graph in accordance with the disclosure.

FIG. 9b depicts an example of a signal chart in accordance with the disclosure. In this example, the voltage signal depicted in FIG. 9a is depicted with only the high frequency component 901. When a voltage with a high frequency component and a low frequency component passes through a high pass filter, the low frequency component of the signal may be removed, leaving only the high frequency component. Whether or not a frequency component of a voltage signal is attenuated may depend on the frequency of the frequency component, as well as the cutoff frequency of the high pass filter.

By filtering out low frequency components 902 of a voltage signal, a high frequency component 901 of a voltage corresponding to a wireless transmission may be transmitted through a set of electrodes in a capacitance module. The high frequency component 901 of the voltage signal may be conducted by multiple electrodes in a capacitance module which are connected by one or more high pass filters.

The high frequency component 901 of the voltage signal may have a lower peak-to-peak voltage than the peak-to-peak voltage of the low frequency component 902 of the voltage signal. In examples where frequency components of a voltage signal have different peak-to-peak amplitudes, a comparator circuit or another type of circuit may be used to distinguish frequency components from each other.

Figure 10:
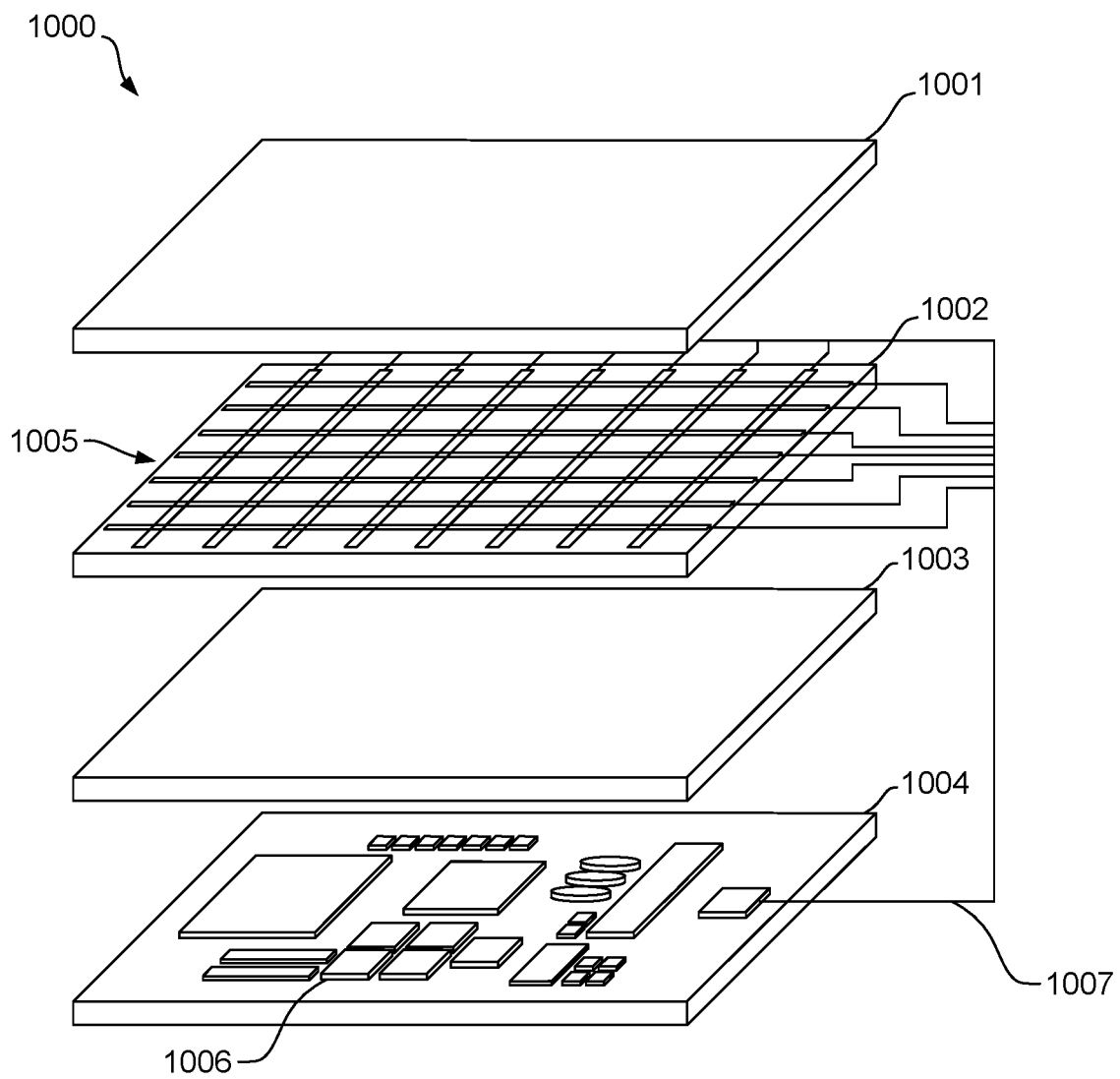
FIG. 10 depicts an example of a stack of layers in accordance with the disclosure.

FIG. 10 depicts an example of a stack of layers 1000 in accordance with the disclosure. In this example, the stack of layers 1000 is part of a capacitance module. The stack of layers 1000 may include a capacitance reference surface 1001, a sensor layer 1002, a shield layer 1003, and a component layer 1004. While the stack of layers 1000 in this example includes four layers, in other examples, a stack of layers may include a different number of layers. In other examples, a stack of layers may include layers in different relative orientations than the layers depicted in this example.

The capacitance reference surface 1001 is located adjacent to the sensor layer 1002 in the stack of layers 1000. The capacitance reference surface 1001 may be made of a glass material, plastic material, another material, or combinations thereof. In some examples, a user may interact with the stack of layers 1000 by touching the capacitance reference surface 1001 with a finger, stylus, or other object. In other examples, a user may interact with the stack of layers by bringing a finger, stylus, or other object near the capacitance reference surface 1001.

The sensor layer 1002 is located adjacent to the capacitance reference surface 1001 and the shield layer 1003 in the stack of layers 1000. The sensor layer 1002 includes a mutual capacitance sensor 1005 having two sets of electrodes which cross each other. The mutual capacitance sensor 1005 may sense user input with the stack of layers 1000. The mutual capacitance sensor 1005 may also be used to transmit or receive a wireless signal according to a Wi-Fi protocol, short range wireless protocol, NFC protocol, another type of wireless protocol, or combinations thereof.

The electrodes in the mutual capacitance sensor 1005 on the sensor layer 1002 may each be in electrical communication with components 1006 on the component layer 1004 via traces 1007. The components 1006 on the component layer 1004 may include a comparator circuit, which may be used to distinguish between wireless signals transmitted or received with the mutual capacitance sensor 1005 and capacitance measurements generated with the mutual capacitance sensor 1005. A comparator circuit may distinguish between each type of signal by measuring the peak-to-peak voltage of each signal.

The components 1006 on the component layer 1004 may include a processor, which may cause the electrodes in the mutual capacitance sensor 1005 to transmit a wireless signal at one time and take a capacitance measurement at a second time. In this way, the capacitance sensor 1005 may switch back and forth between transmitting a wireless signal and taking capacitance measurements. In some examples, the time the capacitance sensor 1005 spends taking capacitance measurements may be as long as seven milliseconds. In other examples, the time the capacitance sensor 1005 spends taking a capacitance measurement may be longer than seven milliseconds. In some examples, the processor is located off of the stack of layers. For example, the capacitance module may be located within a device, and the processor may be part of the motherboard, another processor located within the device, or combinations thereof. In yet other examples, the processor may be remotely located and in wireless communication with the capacitance sensor.

The times spent transmitting wireless signals and measuring capacitance may vary. The time spent transmitting wireless signals and taking capacitance measurements may change based on instructions executed by a processor included on the component layer 1004.

The time the capacitance module spends taking capacitance measurements may vary based on the wireless signals transmitted with the capacitance module. For example, the processor may cause the capacitance sensor 1005 to take capacitance measurements more frequently and to extend the duration of individual sensing periods when no wireless signals have been transmitted or received for some time. Doing so may increase the sensitivity and accuracy of input tracking with the capacitance sensor 1005.

The time the capacitance module spends transmitting wireless signals may vary based on capacitance sensing activity from the capacitive sensor 1005. For example, during some periods when there have been no significant changes in capacitance measured with the capacitance sensor 1005, the processor may cause the capacitance sensor to transmit a wireless signal for a longer period of time than normal. Spending more time transmitting wireless signals may increase the reliability of wireless communications between the mutual capacitance sensor 1005 and other wireless devices.

Other components 1006 included on the component layer 1004 in the stack of layers 1000 may include but are not limited to a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical components or combinations thereof. The components 1006 may be used to operate the capacitance module.

The component layer 1004 itself may be located adjacent to the shield layer 1003 in the stack of layers. The component layer may have a printed circuit board (PCB). The component layer 1004 may be made of an epoxy material, plastic material, fiberglass material, another material, or combinations thereof.

The shield layer 1003 may be located between the sensor layer 1002 and the component layer 1004. The shield layer 1003 may be made of a material constructed to minimize electrical interference between components 1006 on the component layer 1004 and the mutual capacitance sensor 1005 on the sensor layer 1002.

Figure 11:
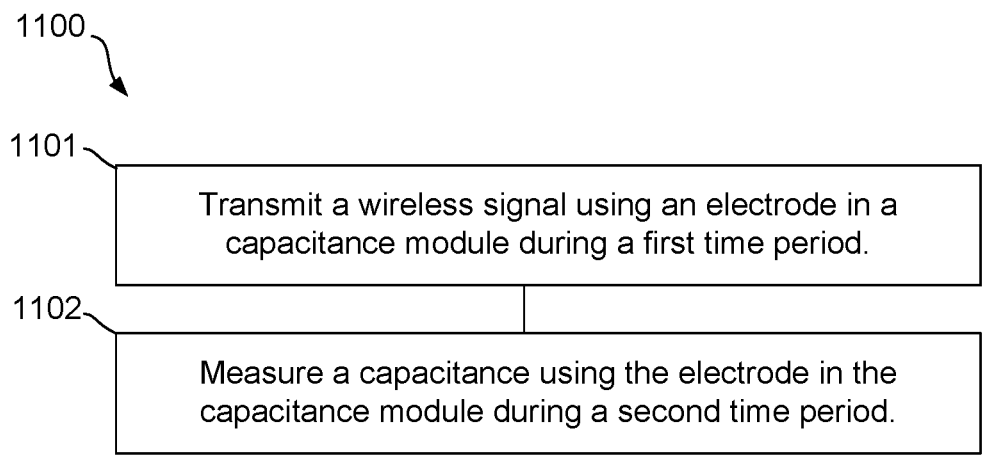
FIG. 11 depicts an example of a method in accordance with the disclosure.

FIG. 11 depicts an example of a method 1100 in accordance with the disclosure. This method 1100 may be performed based on the description of the devices, modules, and principles described in relation to FIGS. 1-10. In this example, the method includes transmitting 1101 a wireless signal using an electrode in a capacitance module during a first time period and measuring 1102 a capacitance using the electrode in the capacitance module during a second time period.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. An apparatus, comprising:
   a set of electrodes incorporated into a capacitance measuring circuit;
   a high pass filter with a cutoff frequency incorporated into the capacitance measuring circuit;
   wherein the capacitance measuring circuit is configured to transmit a wireless signal to an external device when the capacitance measuring circuit receives a driving signal with a frequency greater than the cutoff frequency of the high pass filter;
   a processor and memory, wherein the memory stores programmed instructions which cause the processor, when executed, to:
      transmit the wireless signal using the capacitance measuring circuit at a first time; and
      measure a capacitance signal using the capacitance measuring circuit during a second time;
   wherein the duration of the first time and the duration of the second time change in response to programmed instructions executable by the processor;
   wherein changing the duration of the first time is based, at least in part, on the capacitance signal measured with the first electrode and the second electrode.

2. The apparatus of claim 1, further comprising a comparator circuit incorporated into the capacitance measuring circuit.

3. The apparatus of claim 2, wherein the comparator circuit distinguishes between a capacitance measurement signal and a wireless transmission signal from the capacitance measuring circuit.

4. The apparatus of claim 1, wherein signals generated with the capacitance measuring circuit have a frequency lower than the cutoff frequency of the high pass filter.

5. The apparatus of claim 1, wherein the high pass filter incorporates at least one transistor.

6. The apparatus of claim 1, wherein the capacitance measuring circuit is a mutual capacitance sensor.

7. The apparatus of claim 1, wherein the wireless signal is transmitted according to a Wi-Fi protocol.

8. The apparatus of claim 1, wherein the wireless signal is transmitted according to a short-range wireless protocol.

9. The apparatus of claim 1, wherein the wireless signal is transmitted according to a Near Field Communication (NFC) Protocol.

10. An apparatus, comprising:
    a first set of electrodes;
    a second set of electrodes transverse the first set;
    at least one connection between a first electrode in the first set to a second electrode in the second set with a high pass filter;
    wherein the first electrode in the first set and the second electrode in the second set form an antenna;
    a processor and memory, wherein the memory stores programmed instructions which cause the processor, when executed, to:
       transmit wireless signal to an external device using the first electrode and the second electrode at a first time; and
       measure a capacitance signal using the first electrode in the first set and the second electrode in the second set during a second time;
    wherein the duration of the first time and the duration of the second time change in response to programmed instructions executable by the processor;
    wherein changing the duration of the first time is based, at least in part, on the capacitance signal measured with the first electrode and the second electrode.

11. The apparatus of claim 10, wherein the duration of the second time is seven milliseconds or less.

12. The apparatus of claim 10, wherein changing the duration of the second time is based, at least in part, on the wireless signal transmitted with the first electrode and the second electrode.

13. The apparatus of claim 10, wherein the cutoff frequency of the at least one high pass filter is less than the frequency of the transmitted wireless signal.

14. A method, comprising:
    transmitting a wireless signal to an external device using an electrode in a capacitance module during a first time period;
    measuring a capacitance using the electrode in the capacitance module during a second time period;
    wherein the durations of the first time period and the second time period change in response to instructions executable by a processor in electrical communication with the capacitance module; and
    wherein changing the duration of the second time is based, at least in part, on the wireless signal transmitted with the first electrode and the second electrode.

15. The method of claim 14, wherein the duration of the first time period overlaps with the duration of the second time period.

16. The method of claim 14, wherein the durations of the first time period and second time period are mutually exclusive.

* * * * *